United States Patent Office 3,458,005
Patented July 29, 1969

3,458,005
HYDROSTATIC FRONT WHEEL DRIVE
FOR A TRACTOR
Donald Irwin Malm and Carl Edward Kainer, Cedar Falls, Iowa, assignors to Deere & Company, Moline, Ill., a corporation of Delaware
Filed Nov. 28, 1967, Ser. No. 686,178
Int. Cl. B60k 17/30; F16d 31/02; F16h 1/28
U.S. Cl. 180—44                                     6 Claims

ABSTRACT OF THE DISCLOSURE

An agricultural tractor having an engine, a pair of rearward drive wheels driven through a mechanical variable ratio transmission, a front axle structure having a pair of steerable front wheels, a pair of axial piston-type hydrostatic motors respectively mounted in and connected to the front wheels by planetary reduction gear trains including hydraulically actuated friction clutches, the wheel motors being selectively powered by the main hydraulic pump on the tractor through a control system which provides for a series or parallel operation of the motors and automatic disconnection of the motors in certain conditions of the transmission.

BACKGROUND OF THE INVENTION

This invention relates to an auxiliary hydrostatic front wheel drive system for a tractor having a conventional transmission for driving its rearward drive wheels.

Hydrostatic propulsion drives for tractors and similar vehicles are, of course, well known. In most vehicles utilizing such hydrostatic drives, the hydrostatic drive provides the only propulsion drive, although it is known to utilize hydrostatic wheel units to provide auxiliary power transmission to normally idle wheels on a vehicle having a conventional mechanical transmission driving a pair of drive wheels. However, such auxiliary drives have been relatively independent from the remainder of the vehicle, and their controls have not been integrated with the controls for the mechanical transmission. Also, many previous auxiliary drives have lacked operating flexibility, so that their use has been restricted to a relatively narrow range of operating conditions. Further, most previous systems have required a separate hydraulic pump and have been relatively expensive.

SUMMARY OF THE INVENTION

According to the present invention, an improved auxiliary hydrostatic front wheel drive system is provided for use on a tractor having its rearward drive wheels driven through conventional variable ratio transmission, the hydrostatic drive system feature a pair of rotory hydraulic motors respectively mounted in the front wheels.

One feature of the invention resides in the utilization of the tractor's main hydraulic pump, which supplies fluid at a substantially constant pressure for conventional hydraulic functions on the tractor, to supply fluid pressure to the wheel motors, the system including means for assuring priority to the pressure supply for the tractor hydraulic functions, such as the power steering, power brakes, rockshaft cylinder, and remote cylinder.

An important feature of the invention resides in the controls for this system, which provide for selective forward or reverse operation of the motors without reversing the hydraulic pump, and for selective series or parallel connection of the motors with the pump, the series connection of the motors generally providing only one-half of the motor output torque provided by the parallel arrangement, the series connection being advantageous in certain traction conditions and terrains and also requiring only one-half the fluid flow rate for a given tractor speed.

Another important feature of the invention is the relationship between the hydrostatic drive controls and the main transmission controls, particularly in the provision of means for automatic disconnection of the front wheel drives when the main transmission is shifted to neutral or park conditions, or when the tractor speed, as determined by the ratio in the main transmission, exceeds a predetermined value, or when the main transmission clutch is disengaged.

The drive system also features an electro-hydraulic control system including electrically actuated valves for controlling the supply and flow direction of the fluid pressure to the motors and alternately establishing the series parallel relationship of the motors, these valves being controlled by switches actuated by the operator or automatically actuated by shiftable elements in the main transmission.

Still another feature of the invention resides in the provision of a planetary gear train in each front wheel to transmit the torque from the hydraulic motors to the wheels, each gear train having an associated hydraulically actuated clutch engageable and disengageable to respectively connect and disconnect the hydraulic motor from the wheel, and further in the provision of a fluid connection between the motors and their respective hydraulic clutch actuators so that the clutches are automatically engaged or disengaged when the motors are respectively pressurized or connected to the reservoir.

The system also features inlet, outlet, and motor housing drain conduits which coaxially extend through the vertical axis about which the front wheel units pivot for steering the tractor, thereby avoiding the flexing of the conduits during the steering of the tractor.

DESCRIPTION OF THE PREFERRED EMBODIMENT

Figure 1:
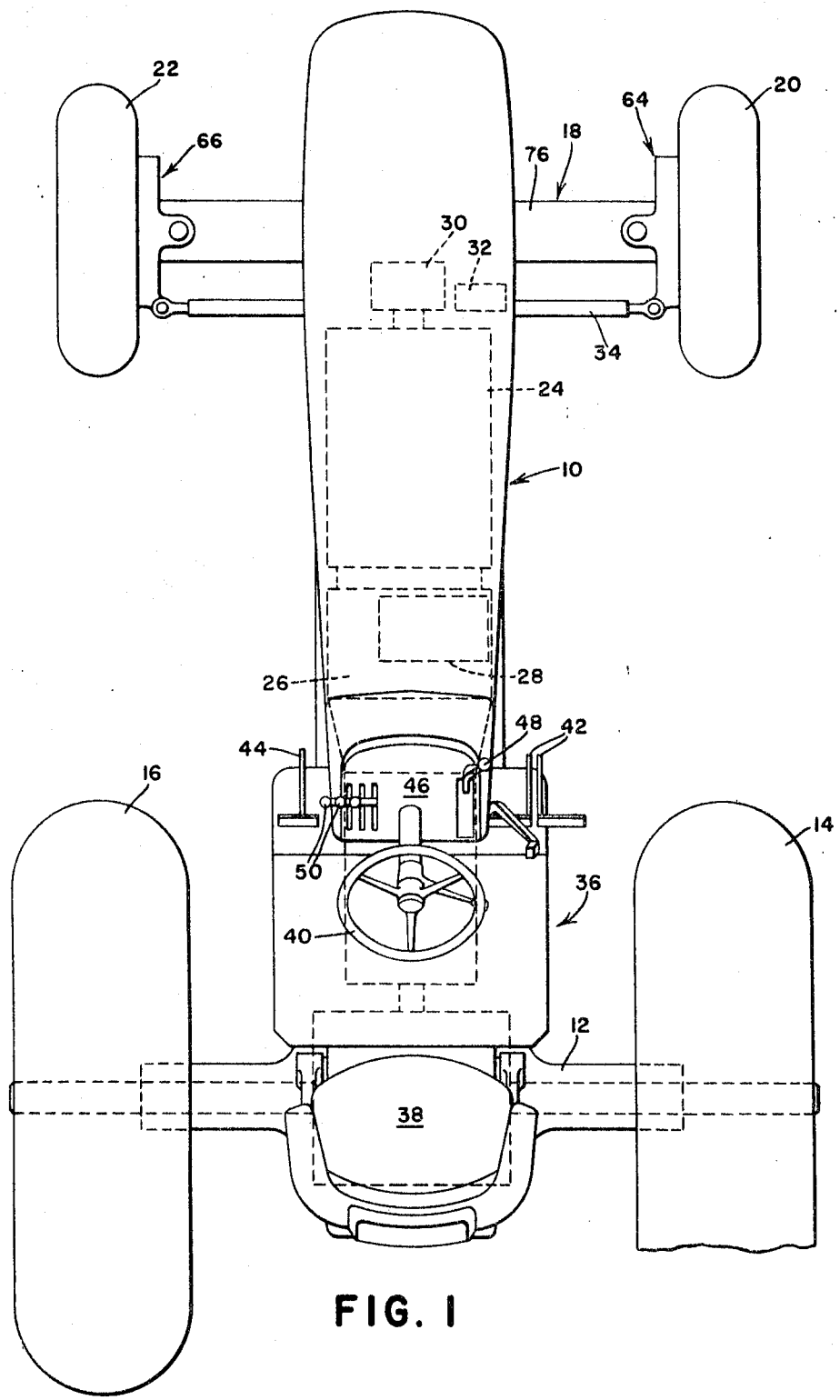
FIG. 1 is a plan view of an agricultural tractor schematically illustrating the general location of most of the principal tractor components, including the hydrostatic front wheel drive.

The hydraulic front wheel drive system is illustrated on a conventional agricultural tractor, the general outline of which is shown in FIG. 1. The tractor has a main tractor frame 10, including a transverse rear axle structure 12, at the opposite ends of which are journaled right and left rearward drive wheels 14 and 16 respectively, and a front axle structure, indicated in its entirety by the numeral 18, at the opposite ends of which right and left steerable front wheels 20 and 22 respectively are mounted. Such conventional tractor components as the engine 24, transmission 26, battery 28, and main hydraulic pump 30 are schematically located on the tractor in FIG. 1 by dotted line outlines. The main hydraulic pump 30 is driven by the engine and supplies fluid pressure for conventional hydraulic functions such as power brakes (not shown), a rockshaft cylinder (not shown), and a power steering cylinder, illustrated by the functional box 32. The cylinder 32 actuates a transversely shiftable rod 34, the opposite ends of which are connected to the right and left front wheels 20 and 22 to provide steering articulation of the front axle structure 18.

The tractor also includes a conventional operator's station, indicated in its entirety by the numeral 36, and including a seat 38, a steering wheel 40, separately or jointly actuatable brake pedals 42 on one side of the operator's station, and a conventional clutch pedal 44, which is depressed to effect disengagement of the main drive clutch in the transmission 26. The steering wheel 40 projects from an instrument panel 46 opposite the seat 38 at the forward portion of the operator's station, and projecting from the instrument panel is a transmission control lever 48 and a plurality of control levers 50 for controlling the rockshaft cylinders and other functions on the tractor. The transmission 26 is a variable ratio transmission, either of the infinitely-variable or step type, the ratio in the transmission in the illustrated embodiment being controlled by fore-and-aft movement of the lever 48, while forward, neutral, and reverse conditions are established by transverse movement of the lever.

Figure 2:
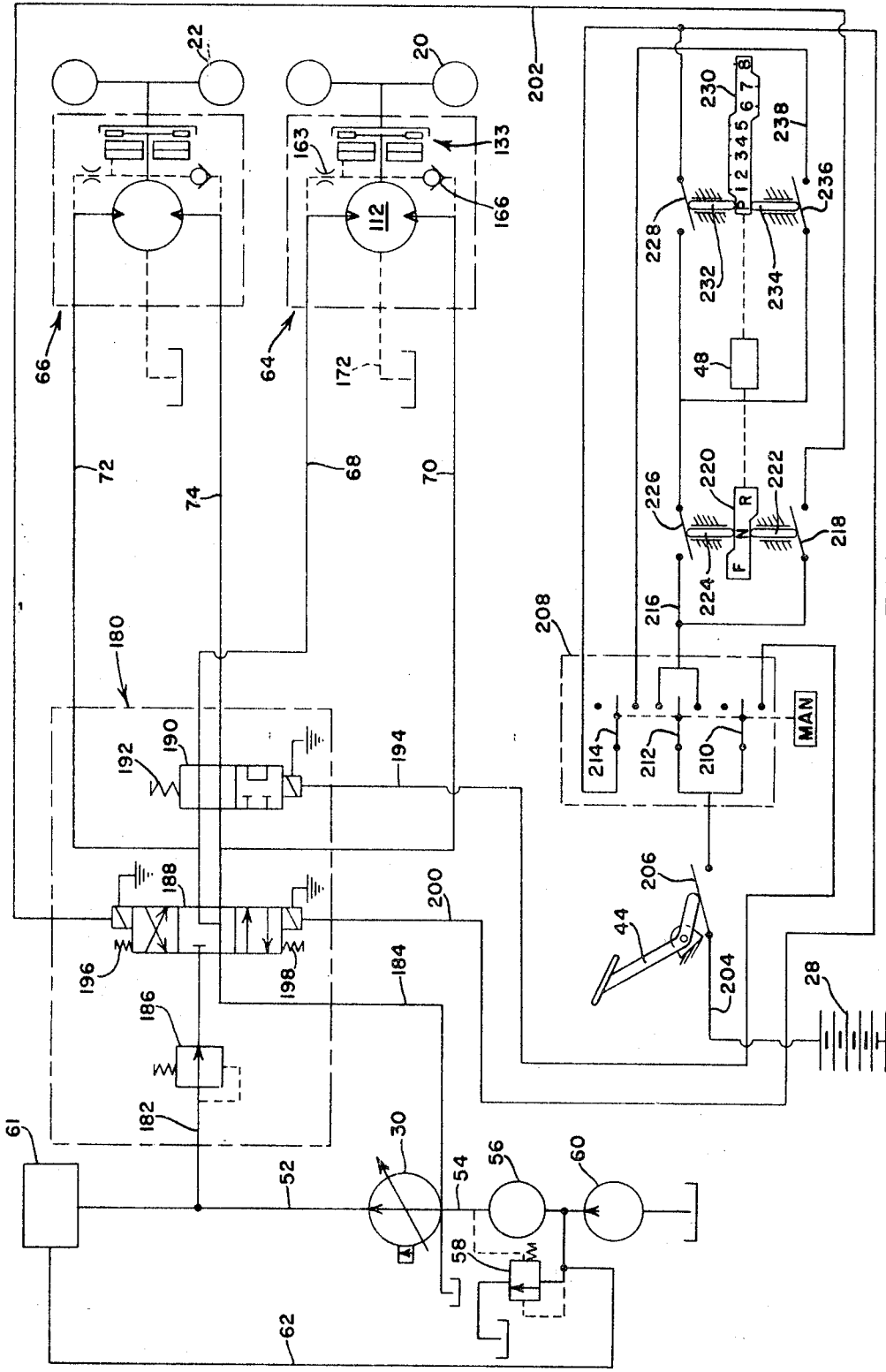
FIG. 2 is a schematic illustration of the hydrostatic front wheel drive system in a neutral condition.
Figure 3:
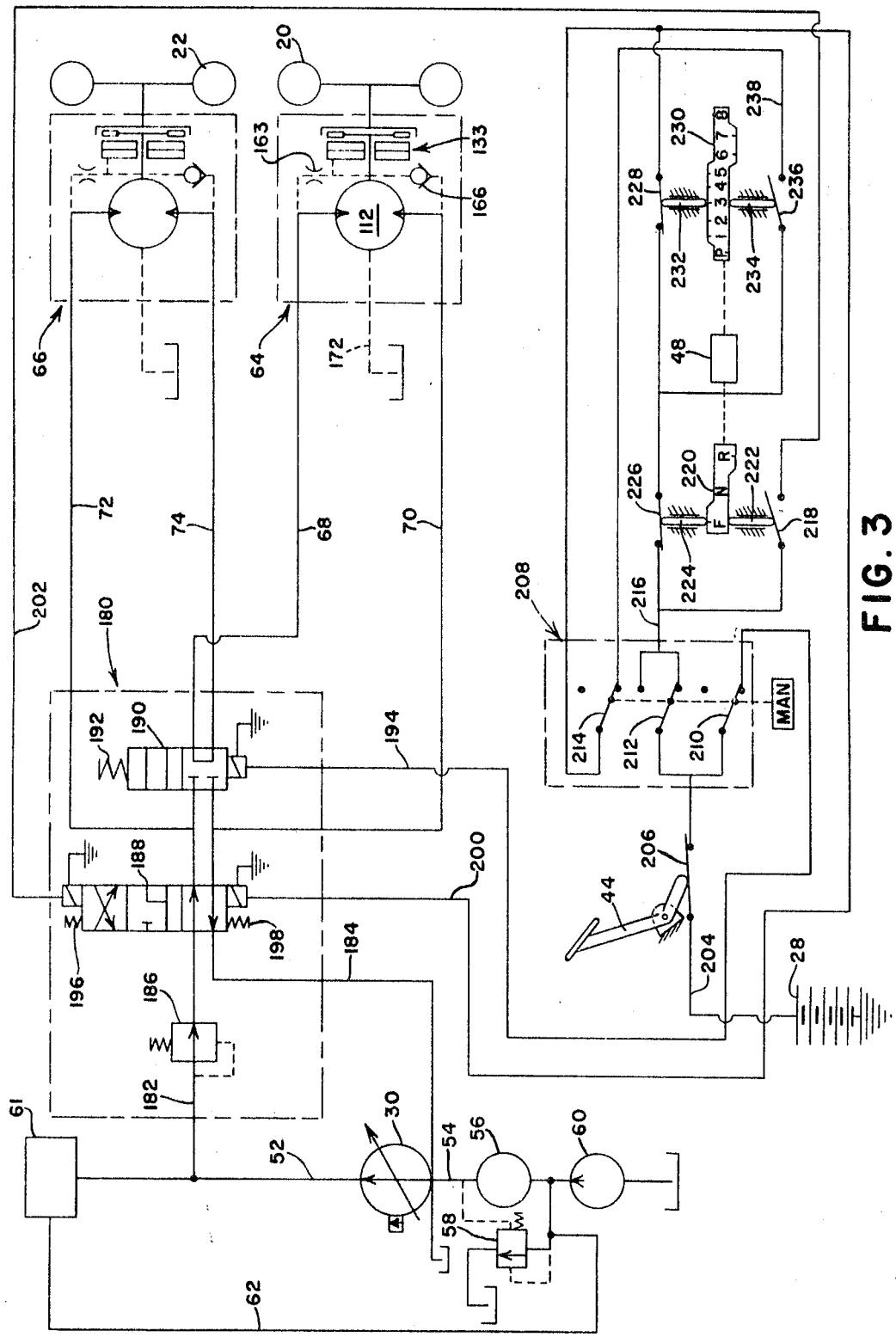
FIG. 3 is a schematic illustration similar to FIG. 2, but showing the drive system engaged for forward propulsion of the vehicle with the hydrostatic front wheel units connected in series.

The rear wheels 14 and 16 are the only drive wheels during normal operation of the tractor, the rear wheels being driven through the transmission 26 in the conventional manner, while the front wheels 20 and 22 are driven at the option of the operator through the auxiliary hydrostatic front wheel drive according to the present invention, the entire drive system being schematically illustrated in FIGS. 2 and 3. The drive system utilizes the tractor's main hydraulic pump 30 as a source of fluid pressure, the pump 30 having a high pressure outlet line 52 and an inlet line 54, which is connected to the tractor hydraulic reservoir through a filter 56 having an associated relief valve 58, the inlet line 54 also having an associated charge pump 60 driven by the tractor engine. The main hydraulic pump 30 supplies fluid pressure to the conventional hydraulic functions, represented by the functional box 61, such as the previously enumerated power steering cylinder 32, rockshaft cylinder, and power brakes, the hydraulic functions being connected to the inlet 54 by a conventional return conduit means 62.

The right and left front wheels 20 and 22 are respectively drivable through right and left hydrostatic drive units 64 and 66, which are coaxially mounted in the respective wheels, the right wheel unit 64 having an inlet conduit 68 and an outlet conduit 70, while the left wheel unit 66 has an inlet conduit 72 and an outlet conduit 74. The inlet and outlet conduits are so described with reference to the flow of fluid during forward driving of the driving wheels, the outlet conduits 70 and 74, of course, serving as the inlet conduits during reverse driving of the wheels 20 and 22.

The construction of the right and left wheel units 64 and 66 is identical, except for a 180° difference in assembly rotation of the swash plate 114. Therefore only the right wheel unit 64, shown in FIGS. 4 and 5, will be described in detail.

The front axle structure 18 includes a central portion 76, which oscillates on the tractor about a fore-and-aft axis in the conventional manner. The opposite ends of the central portion 76 are respectively provided with a yoke 78, each yoke 78 having upper and lower vertically aligned arms 80 and 82, which are respectively provided with upright coaxial bores 84 and 86. A cylindrical pin 88 is mounted in and extends downwardly from the upper arm bore 84 and a similar pin 90 is mounted in and extends upwardly from the lower arm bore 86. Swingably mounted on the pins 88 and 90 for rocking about the vertical axis of the pins is an end portion 92 of the front axle structure, the end portion including a hollow drum-like housing 94 coaxial with the wheel 20 and generally in the same vertical plane with the wheel 20. The end portion 92 also includes an upper projection 96, which extends in a generally radial direction relative to the housing 94 and includes an upright, bearing lined bore 98, adapted to receive the upper pin 88. A similar projection 100 extends downwardly from the housing 94 and includes an upright, bearing lined bore 102 adapted to receive the lower pin 90. The steering articulation of the end portions of the axial structure about the axis of the pins 88 and 90 and the bores 98 and 102, in which they are mounted, is accomplished in the conventional manner by the steering rod 34 which has its opposite ends connected to the swingable opposite end portions 92.

The wheel 20 includes a radial portion 104 having a hub 105 journaled on bearings 106, which, in turn, are mounted on the cylindrical outer surface of the housing 94. The wheel 20 also includes a relatively large, drum-like cap member 108, which is closed toward the outside of the tractor and has its open inner side coaxially secured to the radial portion 104, forming a closed cylindrical cavity in conjunction with the radial portion 104 and the housing 94.

The inner end of the housing 94 is closed by a plate-like member 109 bolted thereon and the opposite or outer end of the housing 94 is closed by a drum-like member 110, which is coaxially bolted to the housing and has its open side facing the member 108 the outer periphery of the member 110 having approximately the same diameter as and coaxially fitting within the inner periphery of the cap member 108.

A fixed displacement, axial piston type hydraulic motor 112, having an associated fixed swash plate 114, is coaxially mounted within the housing 94 and has an outwardly extending output shaft 116 supported in a bearing 118 mounted in an axial opening in the member 110, the opening in the member 110 being provided with a rotary seal which engages the outside diameter of the output shaft 116, so that the interior of the housing 94 is fluid tight.

The output shaft 116 is connectible to the wheel 20 by a compound planetary gear train indicated in its entirety by the numeral 120, the gear train 120 being coaxially mounted within the cavity formed by the cap member 108 and the member 110 coaxial with the wheel and the output shaft 116. The planetary gear train includes a shaft 121, splined to the output shaft 116 and carrying an integral first sun gear 122, a ring gear 124, coaxially mounted in the member 108, and a plurality of planetary pinions 126, constantly meshing with the sun gear 122 and the ring gear 124 and journaled on a planetary carrier 128, only a single planetary pinion 126 being shown in FIG. 4. The planetary carrier 128 is splined to a second sun gear 130, coaxially positioned around the shaft 121 of the sun gear 122. A second annular ring gear 132 is engageable with an annular member 134 coaxially attached to the member 110, the engagement being accomplished by a hydraulically actuated clutch 133, including an annular clutch plate 136, biased away from the ring gear 132 by a plurality of axially extending clutch springs 137. The clutch plate is axially shiftable against the bias of the springs to compress the ring gear 132 against the member 134 by a plurality of hydraulically actuated clutch pistons 138, shiftable in cylinders 140 in response to fluid pressure in the cylinders, the fluid pressure being supplied to the cylinders through a toroidal clutch pressure passage 142 coaxially formed in the member 110. Although only a single clutch actuating piston in the cylinder is shown in FIG. 4, a plurality of such pistons and cylinders are spaced at equal angular intervals around the member 110, the cylinders 140 being formed in the member 110 axially parallel to the motor and wheel.

The upper pin 88 is provided with an axial passage 144, which communicates with a passage 146 in the housing 94. Similarly, the pin 90 is provided with an axial passage 148, communicating with the passage 150 in the housing 94. The upper housing passage 146 has an axially extending portion which communicates with an inlet passage 152 in the end member 109. The passage 152, in turn, is connected to a kidney-shaped motor inlet port 154, the port 154 communicating with a corresponding port in the motor 112 in the conventional manner. Similarly, the passage 150 in the housing 94 is connected to a passage 156 in the member 109, the passage 156 communicating with a kidney-shaped outlet port 158 associated with a corresponding port in the motor 112.

Figures 4, 5:
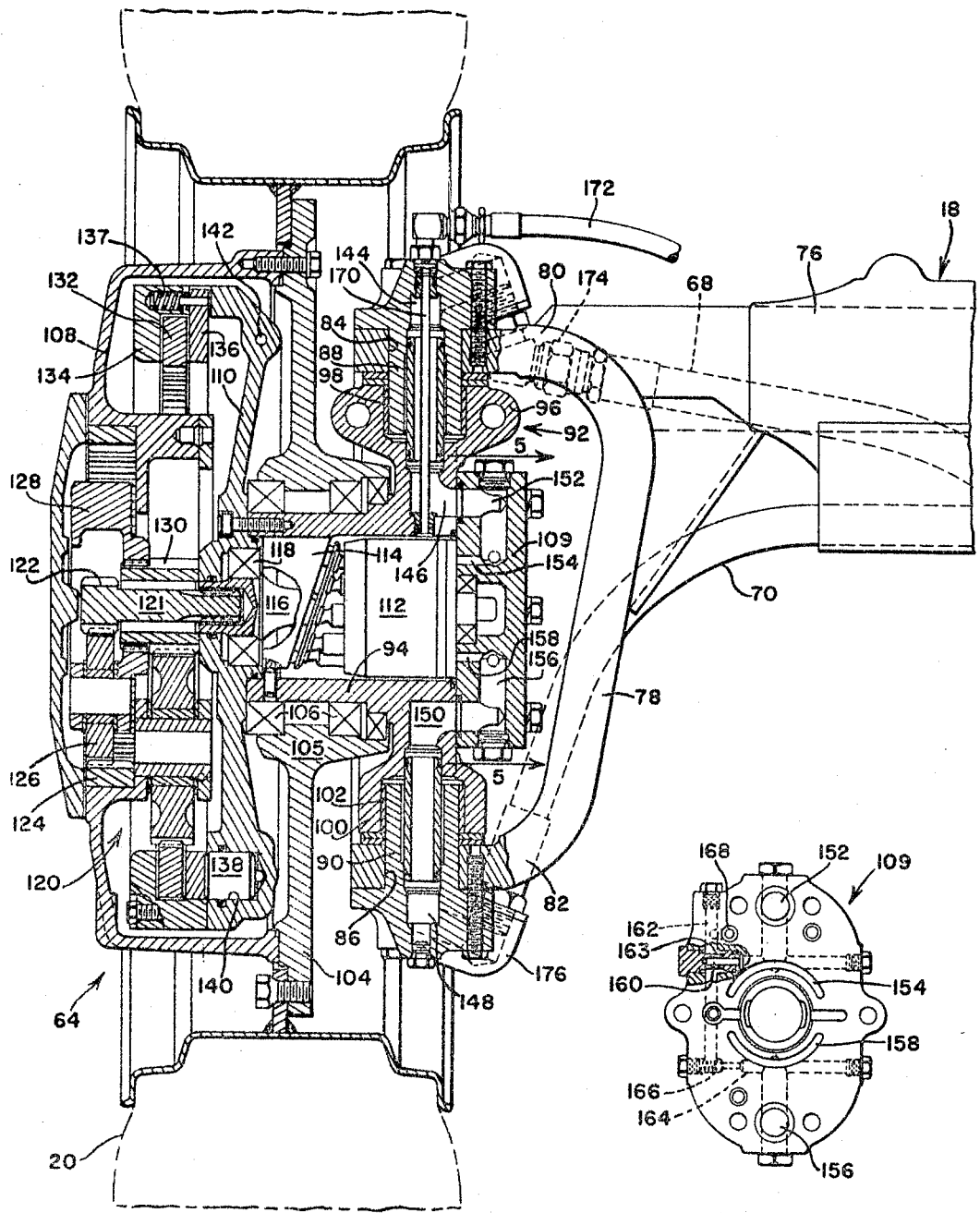
FIG. 4 is an enlarged vertical section along the axis of a front wheel unit, including a portion of the front axle structure.
FIG. 5 is a section of the motor housing as viewed along the line 5—5 of FIG. 4, showing the inlet, outlet, and clutch pressure passages through the end plate of the motor housing, and with a portion of the end plate broken away to more clearly show the interior.

Connected to the inlet passage 152 in the member 109 is an inlet clutch tape 160, which communicates with a vertical passage 162 in the member 109 through an orifice 163, the passage 162 and orifice 163 being best seen in FIG. 5. An outlet clutch tap 164 connects the outlet passage 156 in the member 109 to the vertical passage 162 through a check valve 166, biased to only permit the flow of fluid from the clutch tap 164 to the passage 162. The vertical passage 162 between the orifice 163 and check valve 166 is connected to a passage 168, which extends through the housing 94 and into the member 110, wherein it connects to the clutch passage 142. The passage 168 is not shown in FIG. 4, although it is schematically illustrated in FIGS. 2 and 3.

Coaxially mounted in the passage 144 in the upper pin 88 is a drain tube 170, which also extends radially through the wall of the housing 94 into the interior of the housing, the outer end of the tube 170 being connected to an oil return line 172, so that leakage of oil from the motor 112 is not trapped within the housing 94 but is rather returned to the tractor reservoir via the tube 170 and drain line 172. The inlet line 68 is connected to the passage 144 by means of a suitable fitting 174, and the outlet line 70 is connected to the passage 148 via a fitting 176. During steering articulation of the outer portion of the axle structure, the pins 88 and 90 remained fixed with the central portion of the front axle structure, while the housing 94 swings about the axis of the pins. Since the inlet and outlet lines 68 and 70 are connected to the motor 112 through the axis of the pins, and the drain line 172 is connected to the motor housing 94 through the axis of the upper pin 88, the lines 68, 70, and 172 do not flex during steering articulation, and since the relative position between the central portion of the axle structure and the inlet, outlet, and drain lines does not change, the lines can be rigidly secured to the central portion of the axle structure and placed in an unexposed position. The absence of line flexing during the steering of the vehicle reduces the wear and possibility of leakage in the lines 68, 70, and 172.

The flow of pressurized fluid to the hydrostatic wheel units 64 and 66 is controlled by a valve package, indicated in its entirety by the numeral 180, and having an inlet line 182 connected to the pump outlet line 52, a return line 184 connected to the reservoir, and a plurality of ports respectively connected to the lines 68, 70, 72, and 74. A priority valve 186 is placed in the inlet line 182 and automatically closes when the pressure in the line 182 falls below a predetermined value. Thus, if the requirements of the wheel units and the other hydraulic functions on the tractor, represented by the functional box 61, exceed the capacity of the pump so that the outlet pressure decreases, the valve 186 will automatically close, shutting off the fluid flow to the wheel units to insure an adequate pressure supply for the other hydraulic functions on the tractor, such as the power steering, power brakes, and rockshaft cylinder. For example, in the illustrated embodiment, the normal operating pressure in the outlet line 52 is 2000 p.s.i., and the priority valve 186 is preset to close when the pressure falls below 1900 p.s.i., so that the primary hydraulic functions on the tractor are assured of at least 1900 p.s.i. operating pressure.

The valve package also includes a solenoid actuated direction control valve 188, which is maintained in a neutral condition, as shown in FIG. 2, when the front wheel drive system is not operating. In this position, the inlet line 182 is blocked and the lines 70 and 72 are both connected to the return line 184. When the valve is shifted to the position shown in FIG. 3, for forward rotation of the wheels 20 and 22, the inlet line 72 is connected to the line 182, while the return line 70 is connected to the return line 184. As is apparent from the drawings, the valve 188 is shiftable into a third or reverse condition wherein the inlet line 182 is connected to the line 70 and the line 72 is connected to the return line 184, reversing the flow of fluid through the motors 112.

Also included in the valve package 188 is a series-parallel control valve 190, which is shiftable into a parallel position, as shown in FIG. 2, wherein it connects the inlet line 68 for the wheel unit 64 with the inlet line 72 for the wheel unit 66, and similarly connects the outlet lines 70 and 74, so that the wheel units 64 and 66 are connected in parallel. The valve 190 is also shiftable to a series position, as shown in FIG. 3, wherein the outlet line 74 of the wheel unit 66 is connected to the inlet line 68 of the wheel unit 64, so that the wheel units are connected in series.

The series-parallel valve 190 is biased by a spring 192 toward its parallel position, and is only shiftable into its series position, as shown in FIG. 3, in response to electric current in a solenoid lead 194. The direction control valve is biased into its neutral position, as shown in FIG. 2, by a pair of springs 196 and 198 and is shiftable into its forward position, shown in FIG. 3, by electric current in a solenoid lead 200, and is similarly shifted into its reverse position only by electric current in a solenoid lead 202.

The electric current necessary for the actuation of the solenoid actuated valves 188 and 190 is supplied by the tractor battery 28, the current in the solenoid leads 194, 200, and 202 being controlled by a number of electrical switches. The battery 28 has an output lead 204 and a switch 206 is interposed in the lead 204 to connect or disconnect the entire control system from the battery 28. The switch 206 is actuated by the clutch pedal 44, and when the clutch pedal 44 is depressed to disengage the main transmission clutch, the switch 206 is open, as shown in FIG. 2, whereby, when the main drive is disengaged by the clutch 44, the current supply to the direction control valve 188 is automatically cut off, causing the direction control valve 188 to shift to its neutral condition to disconnect the front wheel units.

The engagement and series-parallel connection of the front wheel units is controlled by a manually actuated switch 208, which is preferably mounted at the tractor operator's station 36 and selectively actuatable by the operator during operation of the tractor. The switch 208 is shiftable into a neutral position, shown in FIG. 2, a series operating condition, shown in FIG. 3, and a parallel operating condition, and includes three switch elements 210, 212, and 214. When the clutch 44 is in its engaged position and the switch 206 is closed, the switch elements 210 and 212 are connected to the battery 28 by the lead 204 and the switch 214 is connected to the lead 200. In the neutral position of the switch 208, the switch elements 210 and 212 are open, so that electric current cannot be supplied to the solenoid actuated valves 188 and 190, whereby the front wheel drive system is in its neutral condition shown in FIG. 2. When the switch 208 is moved by the operator to its series operating position, shown in FIG. 3, the switch element 210 closes to supply electric current to the lead 194, shifting the valve 190 to its series position, and the switch element 212 closes, supplying electric current to a lead 216.

The lead 216 is connectible to the solenoid lead 202 through a switch 218, which opens and closes in response to the position of a control element 220 in the transmission 26. The control element 220 is schematically illustrated as a cam-type element shiftable into three alternate positions in response to the shifting of the transmission into forward, neutral, and reverse conditions. The element 220 can be a component of or responsive to the transmission control lever 48, which, in the preferred embodiment, is shifted laterally to shift the transmission into forward, neutral, or reverse. Of course, the element 220 could also form a part of a transmission control linkage or even a part of the transmission itself. In the preferred embodiment, the element 220 has an associated cam follower 222 which acts on the switch 218. When the transmission is in either neutral or forward position, the switch 218 is open so that the lead 202 is disconnected from the power source. However, when the element 220 is shifted into reverse position, the follower 222 closes the switch 218, connecting the lead 202 to the lead 216, and, when both the switches 206 and 208 are in engaged positions, electric current is supplied to the valve 188 via the lead 202 to shift the valve into its reverse position. The control element 220 similarly has a second cam follower 224, which actuates a switch 226 in the line 216, the switch 226 being closed only when the element 220 is in its forward position, so that electric current can be supplied to the valve 188 via the lead 200 only when the main transmission is positioned for forward operation of the vehicle. As is apparent from the above, the valve 188 is automatically shifted into its forward, neutral, and reverse positions when the main transmission is shifted into its forward, neutral, and reverse conditions.

An additional switch 228 is disposed in the line 216 between the switch 226 and the connection with the lead 200. As is apparent from the drawing, the switch 228 is responsive to a transmission control element 230, which in turn is shiftable into different positions which correspond to the different drive ratios in the transmission 26. The element 230 is labeled with the letter P, which is opposite and between a pair of cam followers 232 and 234 when the transmission is in its "park" condition, as shown in FIG. 2, and with numerals 1–8, which correspond to the forward speeds of the tractor in the preferred embodiment, the cam followers 232 and 234 being shown opposite the numeral 3 on the control element 230 in FIG. 3, representing the tractor in its third speed.

The cam follower 234 actuates a switch 236 in a lead 238, one end of which is connected to the lead 216 and the opposite end of which is connectible to the lead 200 through the switch element 214. The position of the control element 230 in the preferred embodiment is responsive to the fore-and-aft position of the transmission control lever 48, the fore-and-aft position of the control lever establishing the ratio in the transmission. However, like the control element 220, the control element 230 could be associated with other components of the transmission or of different types of control levers, as long as its position is responsive to the ratio in the transmission. For example, in a transmission where two different control levers are used to respectively establish the transmission ratio and the forward, neutral, and reverse conditions in the transmission ratio, the control elements 220 and 230 could respectively be associated with the different control levers.

When the tractor transmission is placed in its park condition, the control element is shifted to the position shown in FIG. 2, wherein both the switches 228 and 236 are open so that the solenoid lead 200 is disconnected from the battery regardless of the position of the switches 206, 208, and 226. In the five lower speed ratios of the transmission, the control element acts on the cam follower 232 to close the switch 228, as shown in FIG. 3, so that, assuming the switches 206, 212, and 226 are closed, electric current is supplied to the solenoid lead 200 to maintain the valve 188 in its forward position. When the motors are connected in parallel, the switch 208 is shifted so that the switch element 212 contacts the upper branch of the lead 216 and the switch element 214 is disconnected from the lead 238. Thus, if the transmission is shifted to any speed range above fifth, the cam follower 232 will cause the switch 228 to open, and since the lead 238 is not connected to the lead 200 by the element 214, the solenoid lead 200 is disconnected from the current source so that the hydrostatic front wheel drive system is shifted to neutral. However, in sixth and seventh speeds forward, the switch 236 is closed, and if the manually actuated switch 208 is placed for series operation of the motors, as shown in FIG. 3, the switch element 214 connects the lead 238 to the lead 200 to maintain the valve 188 in its forward position. As is apparent, in eighth gear, both switches 228 and 236 are open, as they are in the park condition of the transmission, to cause the shifting of the valve 188 to its neutral position.

Thus, the control element 230 and the associated switches 236 and 228 permit operation of the front wheel drives only in first through fifth gears when the wheel units are connected in parallel, and first through seventh gears when the wheel units are connected in series, the wheel units being operable at the higher speeds when they are connected in series since their series connection requires only half the fluid flow rate required by their parallel connection for a given speed. A conventional tractor transmission is generally operative in reverse at lower speeds only, so that the automatic disconnection of the front wheel drive at the higher speed ratios is unnecessary in reverse. Thus, the electric lead 202, which conducts the current for shifting the valve 188 into reverse, bypasses the automatic disconnect provided by the switches 228 and 236.

In operation, the tractor is normally driven by the rear wheels 14 and 16 only. However, if the terrain or traction conditions are such that four-wheel drive of the tractor would be advantageous, the operator merely manually actuates the switch 208. As previously described, when the wheel units are engaged, their direction of rotation automatically corresponds to the rotation of the rear drive wheels. Also, the front wheel drive units 64 and 66 are automatically disengaged when the main transmission is disengaged by the main transmission clutch through depression of the conventional clutch pedal 44.

When the wheel units are engaged for forward operation of the vehicle, the hydraulic lines 72 and 68 are pressurized. Since the clutch actuating cylinders 140 are connected to the lines 68 and 72 through the orifice 163, pressurization of the lines 68 and 72 causes almost instantaneous pressurization of the cylinders 140, so that the clutches 133 are automatically engaged to connect the wheels 20 and 22 to the hydraulic motors 112. The check valves 166 prevent the return of the fluid from the clutch actuator cylinders to the return lines 70 and 74. If the fluid pressure is supplied to the motors 112 through the lines 70 and 74, for reverse operation of the wheel units, pressure in the lines 70 and 74 will open the check valves 166 and pressurize the clutch actuator cylinders 140. The orifices 163 are sufficiently small to restrict the flow of fluid to the return lines 68 and 72 to maintain sufficient pressure in the clutch actuator cylinders 140 for engagement of the clutches 133.

When the wheel clutches 133 are disengaged, the motors 112 are disconnected from the wheels 20 and 22, although some of the elements in the planetary gear train 64 remain connected to the wheels. In normal operation of the tractor, the speed of the wheels is generally not high enough to that the continued engagement of some of the planetary elements is materially detrimental. However, one of the planetary elements in the drive train closest to the wheels could easily be made shiftable out of the drive train to provide a disconnect for the planetary gear train during high speed rotation of the wheels, such as during towing of the tractor.

Normally it is contemplated that the wheel units will be connected in parallel during operation of the tractor with the front wheel drive system engaged. Since the motors 112 are fixed displacement motors, the torque output of the motors is almost a direct function of the pressure drop, so that, assuming a constant output pressure from the pump 30, the motors 112 are constant torque motors regardless of the speed of the tractor. As previously described, if the flow rate through the wheel motors, combined with a flow rate to the other hydraulic functions, exceeds the capacity of the pump, so that the output pressure decreases, the priority valve 186 interrupts the fluid flow to the wheel motors. In parallel operation, the total pump output pressure is available for each wheel unit, and there is an inherent differential action during the turning of the tractor, since the flow rate to the two motors is not necessarily equal, the flow rate through the outside wheel unit being greater during turning of the tractor.

However, in certain conditions it is desirable to decrease the torque on the front wheels. For example, in some soil conditions the front wheels will slip under full torque. Also, in some conditions it is desirable to have different torques on the front wheels. For example, in sidehill operation of the tractor, the downhill wheels support a greater portion of the weight of the tractor, so that for a given torque the downhill wheel unit has a lesser tendency to slip than the uphill wheel unit.

In such conditions, the operator can shift the switch 208 to the positions shown in FIG. 3 for a series connection of the wheel units. When the motors are connected in series, the two motors must share the total pressure drop, so that, assuming an equal pressure drop across each wheel, the output torque of the motors is only one-half the torque of the motors when they are connected in parallel. The lesser torque reduces the tendency of the wheels to slip in certain conditions. Also, in sidehill operation, the downhill wheel will normally get most of the pressure drop and therefore supply most of the torque, which is an advantage since the downhill wheel carries a greater portion of the weight and is less likely to slip. For example, if the system is set for 2000 p.s.i. pump output, in level operation, there would be approximately 1000 p.s.i. pressure drop across each wheel. However, in sidehill operation, the 1000 p.s.i. pressure drop across the uphill wheel can cause wheel slippage, thereby relieving some of the resistance to the rotation of the wheel so that the pressure drop is reduced. Thus the pressure drop across the uphill wheel might drop to 500 p.s.i., for example, to produce a torque at which the wheel would not slip, while the lower wheel would have the remainder of the pressure drop or 1500 p.s.i., producing three times the torque of the upper wheel.

In series operation of the motors, there is no inherent differential action as there is in parallel operation, since the flow rate through the motors is necessarily equal, neglecting leakage. However, during turning of the tractor in series operation, the pressure drop, and hence the torque output and slippage, of the wheel which must run slower increases greatly, decreasing the pressure drop and the torque output of the faster running wheel. Steering is still possible, however, since the faster running wheel can automatically overrun the slower wheel, either by partly disengaging the clutch 133 of the faster wheel or by allowing the motor of the faster wheel to temporarily cavitate. Provision of the drain line 172 communicating oil from the housing 94 through the tube 170 fully protects the motor housing 94 from high pressure oil leakage for both series and parallel operation.

As previously described, the interconnection between the main transmission controls and the controls for the front wheel drive system provides for automatic correlation between the rear drive wheels and the front wheels when the front wheel drive is engaged. The interconnection between the controls also provides for automatic disengagement of the front wheel drive system at tractor speeds where the flow rate through the motors would exceed the capacity of the pump 30.

We claim:

1. In a tractor having an engine, a pair of rearward drive wheels, a variable ratio transmission adapted to transmit driving torque from the engine to the drive wheels, and a hydraulic pump means driven by the tractor engine and having an associated reservoir, the improvement comprising: a front axle structure journaling a pair of steerable front wheels at its opposite ends; a pair of hydraulic motors respectively mounted at opposite ends of the front axle structure and respectively including output shafts; hydraulic circuit means adapted to connect the main hydraulic pump to said motors; a control means associated with the circuit means for controlling the supply of pressurized fluid from the pump means to the motors; a planetary gear train coaxially disposed in each of the steerable front wheels and including coaxial input and output elements, the input element being connected, coaxial with, and driven by the hydraulic motor output shaft, and an output element coaxial with and drivingly connected to the wheel; a clutch means operatively associated with each planetary gear train and engageable to effect a driving connection between the planetary input and output elements and disengageable to disconnect the input and output elements; a hydraulic clutch actuator associated with each clutch means and responsive to fluid pressure to effect clutch engagement; and a clutch conduit means connecting each clutch actuator to the hydraulic circuit means for automatically supplying pressurized fluid to the clutch actuators to effect clutch engagement only when pressurized fluid is supplied to the motor means.

2. The invention defined in claim 1 wherein the clutch conduit means are connected to both the inlet and outlet conduits of the respective motors, and each conduit means includes a check valve interposed between the clutch actuator and one motor conduit, preventing the flow of fluid from the clutch actuator to said motor conduit, and also including a flow restricting orifice interposed between the clutch actuator and the other motor conduit.

3. The invention defined in claim 1 wherein the front axle structure includes a central portion, a pair of end portions disposed at opposite ends of the central portion, the end portions carrying their respective hydraulic motors and journaling the wheels, and generally vertical pin means swingably connecting the end portions to the central portions for steering articulation of the end portions and the wheels mounted thereon, and the hydraulic circuit means includes motor inlet and outlet conduits communicating with each hydraulic motor, said inlet and outlet conduits for the respective motors coaxially extending through at least a portion of the respective pin means.

4. The invention defined in claim 3 wherein the central portion of the front axle structure includes a pair of yokes disposed at opposite ends of the central portion, each yoke having substantially vertically aligned upper and lower arms, and each pin means includes an upper pin mounted in the upper arm and a lower pin coaxially spaced from the upper pin and mounted in the lower arm of each yoke, one of the respective motor conduits coaxially extending through the upper pin and the other conduit extending through the lower pin.

5. The invention defined in claim 4 wherein the end portions of the front axle structure include a hollow drum-like motor housing closed at both ends, the hydraulic motors being coaxially mounted within the respective motor housings and including a pair of drain conduit means respectively extending through either of the respective pin means and connecting the interior of the respective motor housings to the reservoir.

6. The invention defined in claim 3 wherein the clutch conduit means are respectively connected to the inlet and outlet conduits for the respective motors between the connection of said inlet and outlet conduits with the hydraulic motors and the portion of the inlet and outlet conduits extending through the pin means.

References Cited

UNITED STATES PATENTS 3,255,840   6/1966   Tangen.
3,272,279   9/1966   Budzich _____ 180—66 X A. HARRY LEVY, Primary Examiner U.S. Cl. X.R.

60—52, 53; 74—674, 785; 180—43, 60, 66, 77